United States Patent
Care

(10) Patent No.: US 9,037,381 B2
(45) Date of Patent: May 19, 2015

(54) DETERMINING THE DETERIORATION OF A GAS TURBINE ENGINE IN USE

(71) Applicant: ROLLS-ROYCE PLC, London (GB)

(72) Inventor: Ian Colin Deuchar Care, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/173,289

(22) Filed: Feb. 5, 2014

(65) Prior Publication Data

US 2014/0236450 A1  Aug. 21, 2014

(30) Foreign Application Priority Data

Feb. 19, 2013  (GB) .................................. 1302815.4

(51) Int. Cl.
| | |
|---|---|
| *F02C 9/00* | (2006.01) |
| *F01D 21/00* | (2006.01) |
| *F01D 21/14* | (2006.01) |
| *F01D 5/02* | (2006.01) |
| *F02C 9/28* | (2006.01) |
| *F01D 21/04* | (2006.01) |
| *F01D 21/08* | (2006.01) |

(52) U.S. Cl.
CPC ... *F02C 9/00* (2013.01); *F02C 9/28* (2013.01); *F01D 21/04* (2013.01); *F01D 21/08* (2013.01); *F01D 21/14* (2013.01); *F01D 5/027* (2013.01); *F01D 21/045* (2013.01); *F05D 2270/11* (2013.01)

(58) Field of Classification Search
USPC ............... 701/99–115, 29.1, 29.2, 30.5, 30.6, 701/30.8, 30.9, 31.1, 31.2, 31.4, 33.9, 34.4; 702/33, 34–56, 182; 60/223, 779; 73/66, 460, 462
See application file for complete search history.

(56) References Cited

U.S. PATENT DOCUMENTS

| | | | |
|---|---|---|---|
| 4,453,407 A | * | 6/1984 | Sato et al. ........................ 73/462 |
| 7,252,000 B2 | | 8/2007 | Care et al. |
| 7,399,158 B2 | | 7/2008 | Care et al. |

(Continued)

FOREIGN PATENT DOCUMENTS

| | | |
|---|---|---|
| EP | 2 119 876 A2 | 11/2009 |
| EP | 2 431 998 A2 | 3/2012 |
| GB | 2 423 341 A | 8/2006 |

OTHER PUBLICATIONS

European Search Report issued in European Patent Application No. 14 15 3993 on May 23, 2014.

(Continued)

*Primary Examiner* — Thomas Tarcza
*Assistant Examiner* — Tyler J Lee
(74) *Attorney, Agent, or Firm* — Oliff PLC

(57) ABSTRACT

This invention relates to the operation of gas turbine engines, and in particular to determining deterioration of components during operation. In a specific embodiment, the invention is concerned with determining the actions to be taken when a foreign body impact has been detected, for example on a fan blade.

Accordingly, the invention provides a method to take one or more FOD detection apparatus, analyse the likely (probabilistic) outcome, and provide a system to determine subsequent action that assures safety whilst minimising operational disruption.

This invention provides a method and apparatus to identify FOD or bird impact to gas turbine fan blades, assessing the damage that may have occurred whist still in flight and determining post impact actions, including replacement parts.

11 Claims, 4 Drawing Sheets

(56) References Cited

U.S. PATENT DOCUMENTS

| | | |
|---|---|---|
| 8,528,317 B2 * | 9/2013 | Gerez et al. .................. 60/223 |
| 8,560,272 B2 * | 10/2013 | Gerez et al. .................. 702/184 |
| 2004/0060347 A1 | 4/2004 | Comperat et al. |
| 2006/0013692 A1 | 1/2006 | Henning et al. |
| 2011/0041474 A1 * | 2/2011 | Gerez et al. .................. 60/223 |
| 2011/0079015 A1 | 4/2011 | Geis et al. |
| 2011/0178772 A1 * | 7/2011 | Gerez et al. .................. 702/184 |
| 2013/0197747 A1 * | 8/2013 | Tourin et al. .................. 701/34.4 |

OTHER PUBLICATIONS

Jul. 30, 2013 Search Report issued in United Kingdom Patent Application No. GB1302815.4.

* cited by examiner

Fig.5

| | Damage | Balance | Vibration | Visual | EHM Analysis | Instrumentation |
|---|---|---|---|---|---|---|
| Component Manufacture | | Moment Weigh | | | | |
| Module Assembly | | Disc Balance | | | | |
| Pass-off test | | Final Balance | Vibration Signature | Final Visual Check | | Camera/Engine sensors/ EPR/ Vibs (Triax) |
| EIS dirty | Wear | Trim Balance | | | | |
| Inlet Detection | FOD Detection | | | Bird volume /Identify breed | | Camera/ES sensor/ Tomography/Audio |
| Birdstrike Event | Deformation | Shape Change | | | Bird size by Momentum transfer | |
| Post Event | Damage/Deformation /parts damaged | Out of Balance | Vibration Signature | Damage Assessment | Balance planes / error | Camera/Engine sensors -controls and EHM |
| Event Assessment | Damage Map | Inside trim balance limits? | | | Determine advised actions | |
| Action | Go Around and Land | Proceed | Active Rebalance | | Order replacement parts and customisation | |
| Repair | Swap out damaged components | Inspect and dress minor damage | Manual Rebalance | Vibration Signature | New Baseline | Return damaged parts to base for assessment | Camera/Engine sensors |

DETERMINING THE DETERIORATION OF A GAS TURBINE ENGINE IN USE

BACKGROUND OF THE INVENTION

This invention relates to the operation of gas turbine engines, and in particular to determining the deterioration of components during operation. In a specific embodiment, the invention is concerned with determining the actions to be taken when a foreign body impact has been detected, for example on a fan blade.

Birdstrikes on aircraft and their engines are disruptive to service. The fan blades of a gas turbine engine are designed to withstand small birdstrikes, and are capable of flying on. Larger birds may cause damage to the fan blades, and in these circumstances the regulatory authorities require the aircraft to land for an engine inspection. The most common time for such birdstrikes is during take-off or approach to landing. Damage can also be caused by debris sucked up by engines as they travel along the runway and taxi ways. Such incidents, whether caused by birds or by debris, are commonly referred to as foreign object damage or FOD events.

Such events are disruptive to travellers, unnecessarily so if the aircraft is able to fly on with no action required following post-FOD inspection.

If a damaged blade requires replacing, the fan set will need rebalancing because the rest of the blades in the set are part worn. To assist that rebalancing, the blade diametrically opposite the damaged one is also replaced. For a large bird strike (where more than one blade may be damaged), up to six blades may have to be replaced. The replacement, rebalancing, and reassembly into the engine can take several hours.

A fan blade at take-off power may have a tip speed as high as 1400 ft/s (~430 m/s), which can result in bird impact velocities of 850 kt (1570 km/hr) imposing a significant impact load on the fan blade.

The cost of delaying a large aircraft full of passengers until the following day could be as much as $400,000, including the adjustments needed to aircraft schedules and the need to move aircraft around to meet schedules [USDA data]. This does not include the cost and disruption to passengers, nor consequential losses. A report by USDA suggests that the total cost of birdstrikes in the USA has been around $200 million over the last 10 years.

The cost to the environment of a birdstrike is also significant. Current procedure, following a confirmed birdstrike during take-off, is for the aircraft to go around and land. Prior to landing, the aircraft must either fly in a holding pattern to burn off fuel or must dump fuel before landing. For instance, in a recent birdstrike on a 747 out of Los Angeles, the aircraft went out over the sea and dumped 83 tonnes of fuel before returning to land. Although the engines were found to be undamaged and the aircraft continued its journey, there was a significant environmental impact through the dumped fuel and the additional fuel that had been burnt.

In summary, then, there are many birdstrikes that cause no or only very minor damage, but for safety reasons the aircraft is landed, so that the engine may be fully inspected before the journey is completed. This causes disruption to flight schedules and to passengers, and financial and environmental cost.

Various methods and techniques have been used in the past to try and mitigate the problems caused by FOD events, but all have disadvantages.

In order to build up experience from birdstrikes, where damage has occurred, the damaged blades are swabbed and measured. The swabs can provide bird species identification through DNA analysis.

Single camera systems, as described in US2011/0041474, can indicate that damage is present but cannot show the extent of the damage.

Engine vibration systems can measure the effect of out of balance, but currently cannot determine the change in a single blade moment weight. They may be able to detect impacts and, by analysis, determine impact energy and duration.

Use of a single camera in a static frame can be used to determine damage, as this is effectively only a projection in a single plane, but not all forms of damage can be detected. Using a 3D optical metrology system, such as those supplied by GOM, allows a better analysis of damage to be made, but such devices are generally designed to be used on stationary, rather than moving, components.

U.S. Pat. No. 7,399,158 describes a technique for detecting FOD entry into the engine intake, but the technique cannot assess any damage caused by the FOD.

Other methods of detecting impacts on the engine by such as using microphones (as taught in US2011079015) or by vibration and acoustic emissions can help to determine the position and severity of an impact.

SUMMARY OF THE INVENTION

It is an aim of this invention to provide an improved method for determining the deterioration of components during operation, which will reduce and preferably overcome the disadvantages of known solutions. In particular, the invention proposes a method to take one or more FOD detection apparatus, analyse the likely (probabilistic) outcome, and provide a system to determine subsequent action that assures safety whilst minimising operational disruption. This invention provides a method and apparatus to identify FOD or bird impact to gas turbine fan blades, assess the damage that has occurred whist still in flight and determine post impact actions, including replacement parts.

Accordingly, the invention provides a method of determining deterioration of a gas turbine engine as set out in the claims.

This invention relates to the operation of gas turbine engines, and in particular to determining deterioration of components during operation. In a specific embodiment, the invention is concerned with determining the actions to be taken when a foreign body impact has been detected, for example on a fan blade.

Accordingly, the invention provides a method to take one or more FOD detection apparatus, analyse the likely (probabilistic) outcome, and provide a system to determine subsequent action that assures safety whilst minimising operational disruption.

This invention provides a method and apparatus to identify FOD or bird impact to gas turbine fan blades, assessing the damage that may have occurred whist still in flight and determining post impact actions, including replacement parts.

BRIEF DESCRIPTION OF DRAWINGS

Embodiments of the invention will now be described in more detail, with reference to the attached drawings, in which:

FIG. 5 is a table/flow chart showing possible actions and measurements at different points in time.

DETAILED DESCRIPTION OF THE INVENTION

Figure 1:
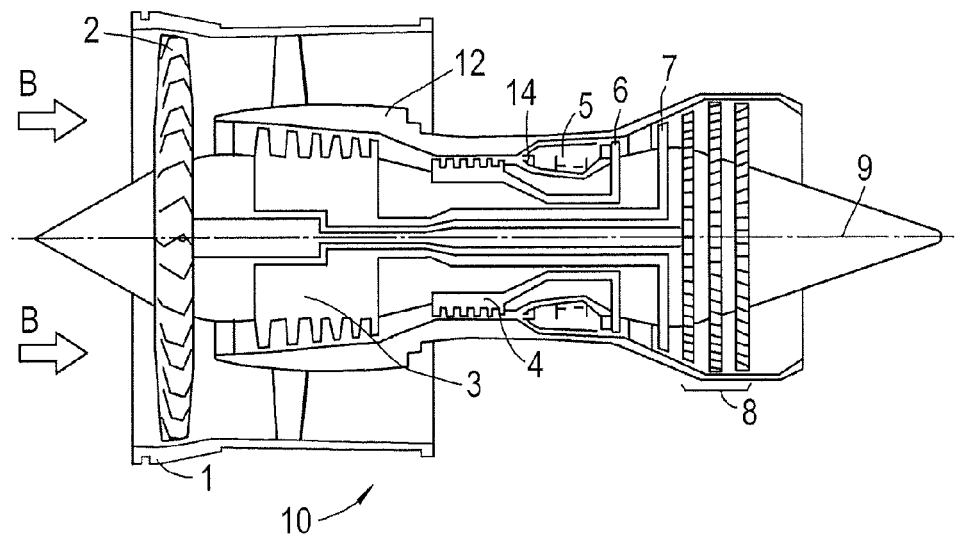
FIG. 1 is a general cross-section of a typical three-shaft gas turbine.

With reference to FIG. 1, a ducted fan gas turbine engine, as used on aircraft, is generally indicated at 10 and comprises, in axial flow series, an air intake 1, a propulsive fan 2, an intermediate pressure compressor 3, a high pressure compressor 4, combustion equipment 5, a high pressure turbine 6, an intermediate pressure turbine 7, a low pressure turbine 8 and an exhaust nozzle 9.

Air entering the air intake 1 is accelerated by the fan 2 to produce two air flows, a first air flow into the intermediate pressure compressor 3 and a second air flow that passes over the outer surface of the engine casing 12 and which provides propulsive thrust. The intermediate pressure compressor 3 compresses the air flow directed into it before delivering the air to the high pressure compressor 4 where further compression takes place.

Compressed air exhausted from the high pressure compressor 4 is directed into the combustion equipment 5, where it is mixed with fuel that is injected from a fuel injector 14 and the mixture combusted. The resultant hot combustion products expand through and thereby drive the high 6, intermediate 7 and low pressure 8 turbines before being exhausted through the nozzle 9 to provide additional propulsive thrust. The high and intermediate turbines respectively drive the high and intermediate pressure compressors by suitable interconnecting shafts. The low pressure turbine is connected to the fan via the LP (low pressure) shaft.

With the incoming air stream B, objects can enter the engine. These objects can be airborne, such as dust and flying creatures, or items sucked up by the speed and force of the incoming air. These objects (not shown) can impact on parts of the engine.

A fan blade at take-off power can travel as fast as 1400 ft/s (~430 m/s) at the tip, which can result in foreign object impact velocities as high as 850 kt (1570 km/hr) imposing a significant impact load on the fan blade. Even so, the fan blade will not be damaged in all cases.

In a first embodiment of this invention, the moment weight of blade, disc, and stub shaft components are measured during the assembly of the engine. Measurement of the moment weight of the assembly is made and balancing corrections are applied. As at present, these values are recorded and stored in the parts database and tracked against the installation (engine). The latest generation of parts also have this information stored on the RFID (Radio Frequency IDentifier) embedded in or attached to the part or component. These values can be read either interactively or at the time of installation by the engine health monitoring system.

During engine start-up and spool up to take-off speed, engine balance may be measured and calculated in several balance planes; one method of doing this is described in U.S. Pat. No. 7,252,000. This can be compared with previous measurements and/or against a datum. From these results and comparison a number of things can be determined, including: what wear to the components has occurred; whether dirt or debris has been deposited on rotating components; changes in balance; indications of possible damage to components; changes in resonance frequencies and modes. For some embodiments, these checks and measurements are made on every start-up; in other embodiments, they are made on demand or in accordance with a flight time based algorithm.

Figure 2A:
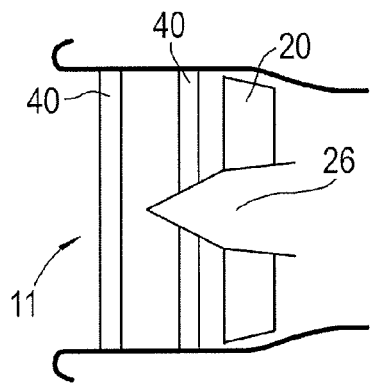
FIG. 2a and FIG. 2b show schematic illustrations of known inlet debris detection and tomography devices.
Figure 2B:
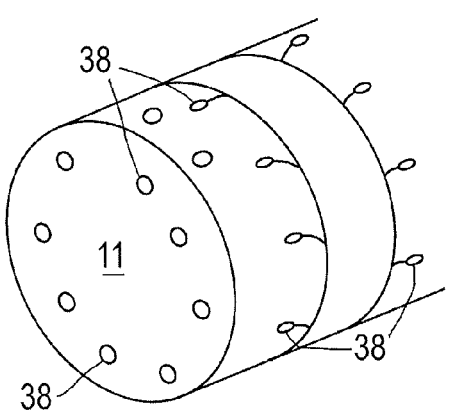

There are several known ways to directly detect the ingestion of foreign objects into the intake of a gas turbine engine. FIG. 2a and FIG. 2b show two such mechanisms.

One mechanism has an electrostatic probe or set of probes 38 in the inlet 11 of the jet engine 10, with the probe signal(s) being applied to a circuit (not shown) for signal conditioning and measurement of the pulse amplitude of a signal. A pulse height discriminator provides output pulses for each signal exceeding the integrated engine noise level. This can trigger a warning circuit or input into the engine health monitoring system. If a set of such probes are deployed, the relative signal strengths can, through conventional tomography algorithms, determine the radial position and approximate size (volume) of the debris entering the inlet. Where two or more axially-spaced sets are deployed, they can give the axial speed and direction of the ingested debris.

In another example of inlet monitoring apparatus, a short-circuited loop of conductor 40 forms an electromagnetic short-circuit hoop probe which is electrically insulated from a gas stream passing through the inlet 11. In a similar manner to the individual probes this electrostatic loop sensor can detect debris entering the inlet. With multiple loops and a charge loop, the size (surface area) and velocity of debris in the inlet can be determined.

If visual image capture is used in addition to one of the arrangements shown in FIG. 2a and FIG. 2b, bird identification can be made and factored into the assessment, based on historical data.

The effect of the impact of the FOD can be measured optically using one camera. It can be synchronised using the once per rev signal or a shaft encoder to ensure the impacted blade can be identified and compared with any change in the balance and moment of the fan disc and the blades. A more detailed image can be obtained using two or three cameras. Optionally, in low light conditions, the image capture can be coordinated with the aircraft beacons to increase the available light, and the damaged blade position determined from the balance signal and timing from the once per rev signal. Optionally, in low light, a series of synchronised pictures can be taken and added to one another to get an average intensified image; this can also be used to show whether part of a blade has gone into vibration or resonance. This system can also look at the nose cone (spinner) and the annulus fillers.

A typical once per rev sensor is an inductive type, sensing a protruding noggin on the shaft. Due to slight movements in the shaft, it has been found that triggering the camera on the rising edge of the signal as it goes through a discrete level is less repeatable than triggering the camera at the signal turning point. This repeatability is required where several images are being averaged or added in low light conditions to get a satisfactory image. Likewise, where the engine LP shaft is also fitted with either an encoder or castellated shaft (sometimes called a phonic wheel)—usually with at least one castellation per blade—the location of the blade may be determined by this means.

Figure 3A:
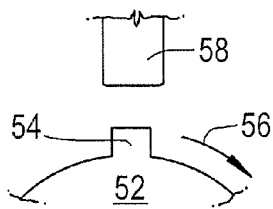
FIG. 3a, FIG. 3b and FIG. 3c show schematic illustrations of signal conditioning and synchronisation.
Figure 3B:
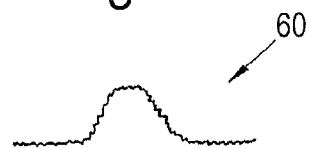
Figure 3C:
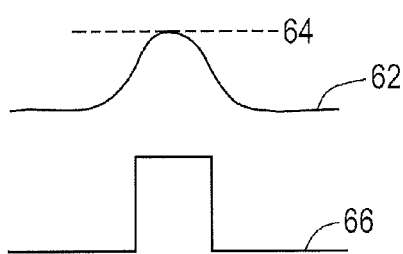

FIG. 3a shows a portion of the rotating shaft 52 with a protruding noggin 54 that acts as the (once per revolution) timing feature. As the shaft 52 rotates in the direction of the arrow 56, the timing feature 54 moves past a sensor 58, generating a signal 60 approximately as shown in FIG. 3b. FIG. 3c shows the smoothed signal 62 and the turning point 64 used to trigger the camera, as described above. FIG. 3c also shows the square wave output 66 produced by signal amplitude level switching for the FADEC (Full Authority Digital Electronic Controller) to calculate the N1 (LP shaft) speed.

Preferably a system with at least two image capture devices is used, not just for system redundancy but also to get a more accurate assessment of blade movement (compared with triggering an image capture at two parts of the rotation, where the blade deflections may be different or oscillating).

The engine health monitoring can assess bird size by calculating the momentum transfer to a blade or blades, from the changes in moment weight for the front and rear of the blade. This calculation can be assisted by inlet detection tomography giving approximate volume and position of impact (height up the blade). This may also be supplemented by FOD identification using image capture of the inlet.

Where components, such as blade, nose cone, or annulus fillers, are fitted with mechanisms to provide indication of component overstrain (as described in patent application GB201015336, published as EP2431998A2) these indications can be used to assess the impact event and thus the remedial action required, irrespective of whether or not visible damage is present.

The image and signals can be transmitted back to base or overhaul for assessment together with other health monitoring signals from the engine (and, optionally, from elsewhere on the aircraft). Alternatively, a basic assessment can be made by the engine health monitoring system. A two tier assessment is also therefore possible with the on engine system dealing with situations where there is almost certainly no damage, only referring to other locations for more detailed assessment or for provision of spares.

Figure 4:
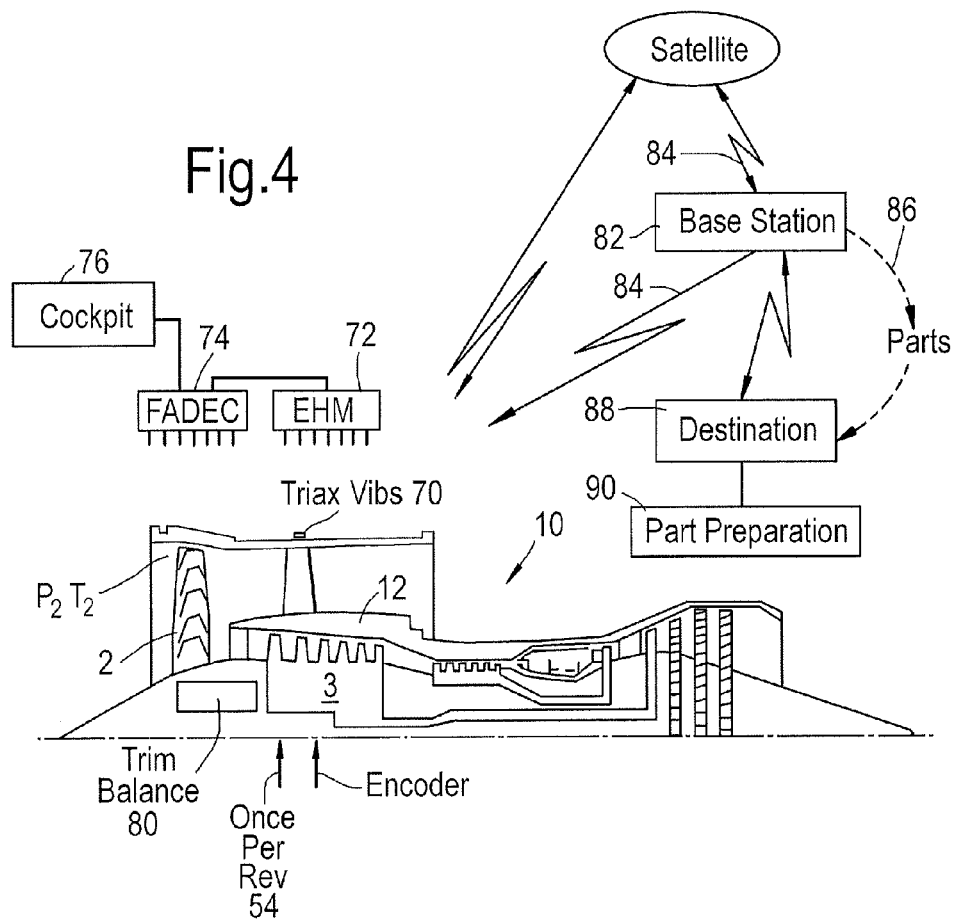
FIG. 4 shows a general engine arrangement embodying the method of the invention.

FIG. 4 shows an example of an engine arrangement embodying the invention, and some of the possible signal combinations that could be used and how they link to the broader aircraft systems.

The engine health monitoring system 72 will operate as normal, and if engine parameters go out of bounds the engine control system 74 may indicate to the pilot 76 to shut down the engine 10, or to reduce or limit the thrust demanded. Where the engine health monitoring system has details of the expected moments for the blades, it can determine the likely level of damage and set a running restriction if required, or flag an action to the cockpit. Knowing the change in moment for a blade can also predict if particular speeds and resonant modes need to be avoided; this can also be confirmed using engine vibration measurement 78. On some engines it is possible to perform small balance adjustments 80, so (if it is safe to do so) a rebalance cycle may be instructed to the engine controller 74.

In the case where the overhaul base 82 or operations centre do the analysis, the measured parameters can be sent by satellite or other wireless communication method 84. The overhaul base 84 can then produce a probabilistic result based on historical data, engine type, speed, species of bird ingested (or other identification of FOD), and a range of engine and aircraft parameters. This probabilistic result will then inform the decision whether to land and inspect, as current procedures, or to proceed in the flight, with or without restrictions on engine running. For safety reasons, this decision will also be influenced by other factors, such as: weather; route; availability of suitable landing areas along the route; flight duration; and quality of data in the assessment. Where it has been assessed that remedial action is required, the operations centre 82 can order up 86 a replacement blade or spinner (nose cone) together with any other parts required to be ready for the aircraft when it lands at its destination 88. This may include adjustments to be made to the blade or pair of blades in order to fit directly into the existing disc with minimum of adjustments to get the engine back into a flightworthy condition. As it can take some time for an aircraft to either dump fuel or burn it up before landing, the parts may be prepared 90 and ready before the aircraft has landed. Parts can be changed whilst passengers are being deplaned and waiting whilst the aircraft is refuelled. This minimises the disruption caused by the damage and the associated remedial actions.

If the impact is less severe the flight may continue, with the overhaul base assessing any remedial action to be taken by the ground crew at the destination airport when the plane lands, such as performing an engine wash cycle, dressing blade edges or adjusting the disc balance.

As per current system, the parts record database is updated with details of birdstrike/FOD impact together with damage map and any corrections made—such as disc balance, blade moment weight adjustments, edges dressed or repaired, liner treatment or filling post the rebalance. This information may also adjust the 'remaining useful life' assessment for that component.

FIG. 5 provides in tabular form a summary of possible actions and measurements at different points in time: from component manufacture, through service and any FOD events, and including any consequential repair or remedial actions. The table is intended to be illustrative rather than exhaustive, and of course includes steps that are optional.

The table illustrates the philosophy behind the invention, showing that parameter measurements may be taken at various stages during the service life of a component or engine (the rows of the table) and these measurements may encompass many different sorts of information (the columns). It will be understood that embodiments of the invention may make use of any combination of the measurements shown in the table, and that other measurements or types of information, or measurements made at other key times during the manufacture or service life of components or engines, may be incorporated into the probabilistic determinations of the invention.

Figure 6:
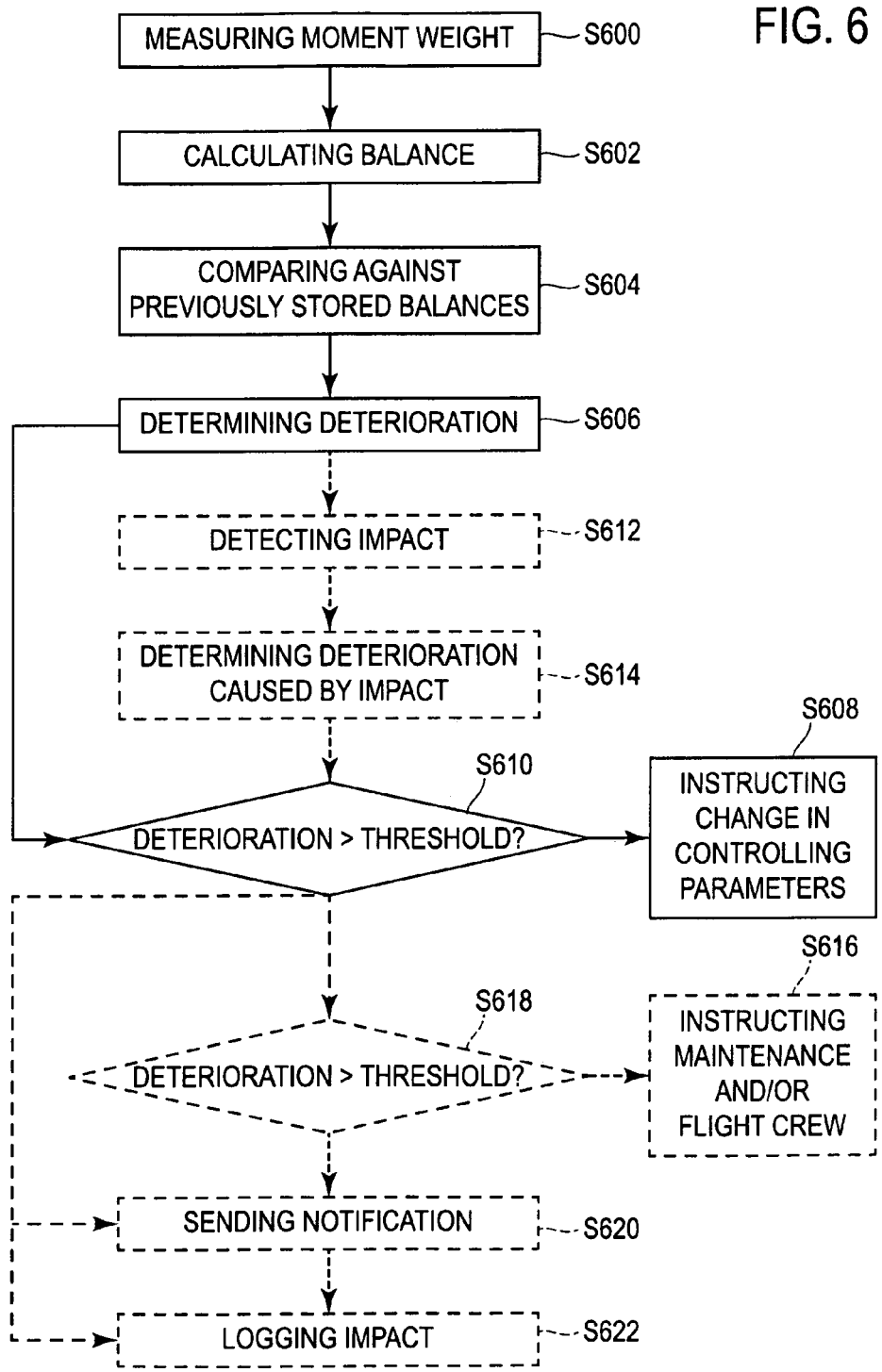
FIG. 6 is a flow chart showing a method according to several embodiments.

A method of determining deterioration of a gas turbine engine in use according to several embodiments is shown in FIG. 6. The method includes: measuring moment weights of a plurality of components of the engine (S600); calculating from the measurements a balance of the engine at a plurality of balance planes (S602); comparing the calculated balances against previously stored balances (S604); based on the results of the comparison, determining a position and magnitude of deterioration of the components (S606); and instructing a change in controlling parameters of the engine (S608) if the determined deterioration exceeds a threshold (S610). In some embodiments, the method further includes: detecting impact of a foreign body on a component of the engine (S612); and determining the position and magnitude of the deterioration caused by the impact based on the results of the detection (S614). In some embodiments, the method further includes instructing a maintenance and/or flight crew to perform actions to ensure continued safety of passengers, crew, engine and aircraft (S616) if the deterioration exceeds a particular threshold (S618). In some embodiments, the method further includes sending a notification to an airport or overhaul base or operating base (S620). In some embodiments, the method further includes logging and recording the impact and a severity of impact (S622).

Thus, the invention provides a method to identify FOD or bird impact to gas turbine fan blades, assessing the damage that may have occurred whist still in flight and determining post impact actions, including ordering and optionally preparing replacement parts. As part of this, the immediate assessment of the impact to determine flightworthiness helps ensure safety whilst minimising disruption to the customer and the travelling public.

The advantages that this invention provides are: to identify the type and source of FOD; to reduce delays and cancellations of aircraft due to FOD; to manage replacement of damaged parts in a timely manner; and to reduce the environmental impact of the actions performed after a birdstrike or FOD incident.

The invention is able to identify the ingestion of objects into an engine intake, identify visible damage and confirm damage severity by reference to other engine parameters. Based on engine parameters, knowledge base, and non-visible damage assessment/estimation, the invention allows the production of a suggested course of action or series of actions—for example, engine shutdown, spool to approach idle, land at nearest airport, initiate in-flight rebalance/trim, fly on de-rated, fly-on unrestricted with inspection at destination. Furthermore, the invention allows the preparation of an action sheet for ground crew when the plane has landed (at location of next landing). These actions could include a temporary change (such as blade swab and clean followed by dressing of leading edges) with full part detailed inspection or replacement at next return to home (service) base. As part of the preparation, parts can be kitted with custom adjustments to minimise servicing and inspection time such as replacement parts (blade, annulus filler, nose cone, balance weights) together with any consumables required to complete the tasks.

A system according to the invention could be added to an engine wash system, to check that cleaning is complete or to instruct the system where to direct the cleaning jets. Rather than having a fixed cleaning cycle, if the engine cleans up quickly the wash can be stopped, thus minimising the energy used and the environmental impact of excessive use of cleaning fluids. Likewise, an inspection of the cleaned parts for possible damage can be made.

Embodiments of the invention have been described with regard to rotating components of a gas turbine engine. However, the invention could equally well be put into effect with regard to the stationary or static components of an engine, such as stator vanes, guide vanes and casing liners. It may be advantageous to apply the invention both to static and to rotating components. Furthermore, the invention has been described in the context of a three-shaft gas turbine engine; but it will be appreciated that the invention could equally well be applied to engines with other configurations, such as two-shaft engines or those in which the incoming air stream passes through or over static components before reaching the first rotating components.

The invention claimed is:

1. A method of determining deterioration of a gas turbine engine in use, comprising the steps of:
    a) measuring moment weights of a plurality of components of the engine;
    b) calculating from the measurements a balance of the engine at a plurality of balance planes;
    c) comparing the calculated balances against previously stored balances;
    d) based on the results of the comparison, determining a position and magnitude of deterioration of the components; and
    e) if the determined deterioration exceeds a threshold, instructing a change in controlling parameters of the engine.

2. The method of claim 1, further comprising before step e) the steps of:
    da) detecting impact of a foreign body on a component of the engine; and
    db) based on the results of the detection, determining the position and magnitude of the deterioration caused by the impact.

3. The method of claim 2, in which in step da) a size and position of the foreign body are detected.

4. The method of claim 3, in which the size and position are detected optically.

5. The method of claim 4, in which the detection is synchronized with a rotation of the engine.

6. The method of claim 5, in which the detection comprises combining or averaging a plurality of images.

7. The method of claim 4, in which the detection is by a plurality of optical detectors.

8. The method of claim 1, further comprising the step of:
    f) if the deterioration exceeds a particular threshold, instructing a maintenance and/or flight crew to perform actions to ensure continued safety of passengers, crew, engine and aircraft.

9. The method of claim 1, further comprising the step of
    g) sending a notification to an airport or overhaul base or operating base.

10. The method of claim 2, further comprising the step of
    h) logging and recording the impact and a severity of impact.

11. The method of claim 1 in which the components comprise static components.

* * * * *